United States Patent Office 3,576,808
Patented Apr. 27, 1971

3,576,808
N-4-PHENYL-1-PIPERAZINYLALKYL-5-PHENYL-OXAZOLIDINONES
Robert Norman Schut, Edwardsburg, Mich., assignor to Miles Laboratories, Inc., Elkhart, Ind.
No Drawing. Filed Sept. 15, 1967, Ser. No. 668,167
Int. Cl. C07d 51/70
U.S. Cl. 260—268          5 Claims

ABSTRACT OF THE DISCLOSURE

N - 4 - phenyl - 1 - piperazinylalkyl-5-phenyl-oxazolidinones of the structural formula:

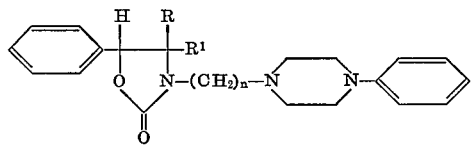

in which R is H or methyl, $R^1$ is H or methyl, or $RR^1$ is oxygen; and $n$ is an integer from 2 to 5; and pharmacologically acceptable salts thereof. These compounds are useful as antihypertensive agents. These compounds are prepared by: (a) condensation of a styrene oxide with 4-aryl-1-piperazinylalkylamine to form an intermediate aminoalcohol, or (b) reacting a β-hydroxyphenethylamine with a 4-aryl-1-piperazinylalkyl halide to form the intermediate aminoalcohol, or (c) reacting an alkyl mandelate with 4-aryl-1-(ω-aminoalkyl)piperazine to form an intermediate mandelamide; and treating the mandelamide with phosgene or ethyl chloroformate to effect ring closure.

---

This invention relates to a novel series of compounds having useful pharmacological properties. More particularly, the invention relates to a novel series of 3-(4-aryl-1-piperazinyl)alkyl-5-aryl-2-oxazolidinones and the preparation thereof.

The novel compounds of this invention are graphically represented by the general structural formula

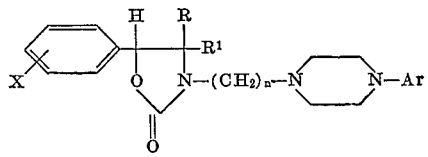

in which R is a member selected from the group consisting of hydrogen, alkyl and carboxyl, $R^1$ is a member selected from the group consisting of hydrogen and alkyl, or $RR^1$ is oxygen, $n$ is an integer from 2 to 5 inclusive, X is a member selected from the group consisting of o-halogen, p-halogen, m-halogen, o-hydroxy, p-hydroxy, m-hydroxy, o-alkoxy, m-alkoxy, p-alkoxy, o, m-dihalo, o, p-ing of hydrogen, alkyl and carboxyl, $R^1$ is a member dihalo, m, p-dihalo, o, m-dihydroxy, o, p-dihydroxy, m, p-dihydroxy, o, m-dialkoxy, o,p-dialkoxy and m, p-dialkoxy, and Ar is a member selected from the group consisting of phenyl and substituted phenyl. Advantageously the substituents of the Ar group comprise o, m, and p, halogen, alkoxy or lower alkyl.

These new compounds may be isolated in the form of a free base. Advantageously, the compounds are prepared as pharmacologically acceptable, nontoxic water-soluble, acid addition salts of mineral acids or organic acids. For example, suitable acids for forming these salts include halogen acids, sulphuric acid, phosphoric acid, citric acid, maleic acid and oxalic acid. Other acids that form pharmacologically acceptable acid addition salts may be used in a similar manner. Generally, the acid addition salt has the beneficial property of greater solubility in water than the free base.

The novel compounds of this invention are useful as antihypertensive agents. Medications including these compounds as active ingredients are effectively administered orally or intravenously according to accepted pharmacological procedures.

Suitable medications may be formed by combining one or more of the active ingredients, as a free base or preferably as a pharmacologically acceptable acid addition salt, in dosage units with commonly accepted diluents and tabletting adjuncts such as cellulose powder, cornstarch, lactose, talc, stearic acid, magnesium stearate gums and the like in accordance with accepted manufacturing practices. Medications may also be formed by combining the water soluble salt with water, glucose solution and similar liquid carriers. These medications may be either in solid or liquid state and may be compounded as tablets, powders, capsules, suspensions and similar dosage forms.

To prepare 3-(4-aryl-1-piperazinyl)alkyl-5-aryl-2-oxazolidinones a novel intermediate compound having the structural formula:

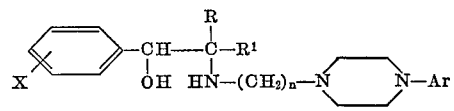

is reacted to effect ring closure.

This intermediate, an N-(β-hydroxyphenethyl)-N-[ω-(4-aryl-1-piperazinyl)] alkylamine, is facilely prepared by reacting a styrene oxide of the formula:

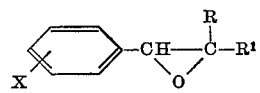

with an appropriate 4-aryl-1-piperazinylalkylamine of the formula:

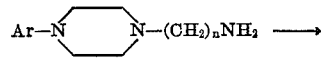

In carrying out this reaction it is desirable to utilize suitable solvents which are substantially inert under the reaction conditions. Suitable solvents include benzene, 2-propanol, ethanol, methanol and the like. The reaction conditions, including the solvents, are not considered critical. Preferably the reaction is carried out under reflux for periods of time sufficient to allow completion of the reaction. Reflux times between about 6 and 20 hours are adequate for completion of the reaction. During refluxing the reactants may also be stirred.

The novel intermediate may be prepared by reacting a β-hydroxyphenethylamine of the structural formula:

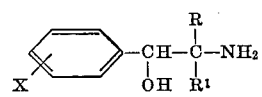

with an appropriate 4-aryl-1-piperazinylalkyl halide of the structural formula:

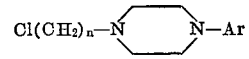

The conditions of this reaction are not considered critical. Suitable solvents such as benzene, 2-propanol, ethanol and the like that are substantially inert under the reaction conditions are preferred. The reaction is beneficially performed under reflux with stirring for between about 6 and 20 hours. Extended periods of time are utilized to permit completion of the reaction.

The intermediate compound may also be prepared by reacting an alkyl mandelate of the formula:

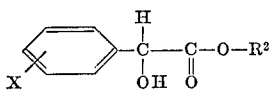

in which R² is a lower alkyl, with a compound of the formula:

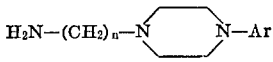

This reaction is beneficially carried out at an elevated temperature.

The resulting novel intermediate compound is then reacted with phosgene or ethyl chloroformate to effect ring closure. Although the conditions for this ring closure are not considered critical, reactants are beneficially maintained between about 20° and 30° C. with phosgene and between about 5° and 10° C. with ethyl chloroformate. Solvents that are unreactive under the reaction conditions are preferred. For example, solvents such as chloroform, pyridine, toluene, ethyl acetate, and acetonitrile are suitable.

The preparation of the novel compounds of the invention will be further demonstrated in the following examples. These examples are illustrative of the preparation of some compounds of the invention and will make the preparation of the compounds set forth in the appended claims evident to one skilled in the art.

EXAMPLE I

3-[3-(4-phenyl-1-piperazinyl)propyl]-5-phenyl-2-oxazolidinone (A) N-[3-(4-phenyl-1-piperazinyl)propyl]-β-hydroxyphenethylamine: A mixture of 4-phenyl-1-(3-aminopropyl)piperazine (107.5 g., 0.49 mole) and styrene oxide (59 g., 0.49 mole) in 100 ml. of anhydrous benzene was heated under reflux for 6 hours. The solvent was removed and the residue was recrystallized 3 times from benzene-petroleum ether to give 43 g. of product, M.P. 97–98° C.

Analysis.—Calcd. for $C_{21}H_{29}N_3O$ (percent): N (basic), 8.25. Found (percent): N (basic), 8.06.

(B) 3-[3-(4-phenyl-1-piperazinyl)propyl]-5-phenyl-2-oxazolidinone: To a stirred suspension of 20.0 g. (0.059 mole) of N-[3-(4-phenyl-1-piperazinyl)propyl]-β-hydroxyphenethylamine in 400 ml. of toluene, 200 ml. of ethyl acetate and 200 ml. of 20% NaOH was added a cold solution of 13 g. (0.13 mole) of phosgene in 100 ml. of toluene over a 15-minute period at 20–30° C. The mixture was allowed to stir 30 minutes longer after which the organic phase was separated and dried. Removal of solvents gave 21.8 g. of thick white syrup which was stirred with ether to form a white solid (12.6 g.), M.P. 95–96.5° C.; mixed M.P. with starting aminoalcohol (98–99° C.) was depressed 82–87° C. The infrared spectrum (CHCl₃) showed no OH absorption; a strong band was present at 1750 cm.⁻¹ attributable to cyclic carbamate C=O.

Analysis.—Calcd. for $C_{22}H_{27}N_3O_2$ (percent): N (basic), 3.84. Found (percent): N, (basic), 3.85.

(C) 3-[3-(4-phenyl-1-piperazinyl)propyl]-5-phenyl-2 oxazolidinone maleate: An 11.5 g. sample of 3-[3-(4-phenyl-1-piperazinyl)propyl]-5-phenyl-2-oxazolidinone was dissolved in 200 ml. of ether and 50 ml. of methanol and treated with 4.24 g. af maleic acid in ether-methanol (50 ml.). The solution became turbid and in a short time crystallization took place. The maleate was collected, washed with methanol-ether (1:9) and with ether, yield 14.2 g., M.P. 161–162° C.

Analysis.—Calcd. for $C_{22}H_{27}N_3O_2 \cdot (CHCO_2H)_2$ (percent): N (basic), 2.91; N (total), 8.73. Found (percent): N (basic), 2.93; N (total), 8.64.

EXAMPLE II

3-[3-(4-phenyl-1-piperazinyl)propyl]-4-methyl-5-phenyl-2-oxazolidinone maleate (A) N-3-(4-phenyl-1-piperazinyl propyl)-N-α-methyl-β-hydroxyphenethylamine: A mixture of norephedrine (30 g., 0.198 mole) and 4-phenyl-1-(3-chloropropyl)piperazine (47.1 g., 0.198 mole) in 400 ml. 2-propanol was heated under reflux with stirring overnight. The mixture was filtered and the solvent was removed. The residue was recrystallized from 2-propanol to give 41 g. of product, M.P. 95–96° C.

Analysis.—Calcd. for $C_{22}H_{30}N_3O$ (percent): N (Dumas), 11.92. Found (percent): N (Dumas), 11.86.

(B) 3-[3-(4-phenyl-1-piperazinyl)propyl]-4-methyl-5-phenyl-2-oxazolidinone maleate: To a stirred suspension of 41 g. (0.116 mole) of the aminoalcohol described above in 200 ml. of chloroform and 200 ml. of 20% NaOH was added a solution of 30 g. of phosgene in 100 ml. of chloroform over a period of 30 minutes at 20–30° C. The mixture was allowed to stir 30 minutes longer after which the organic phase was separated and dried. Concentration of the chloroform gave 41 g. of free base. To 41 g. of free base in 2-propanol was added 13.7 g. of maleic acid in methanol. The salt which formed was collected and dried to give 39 g. of product, M.P. 142–143° C.

Analysis.—Calcd. for $C_{23}H_{29}N_3O \cdot C_4H_4O_4$ (percent): N (basic), 5.65; N (Dumas), 8.48. Found (percent): N (basic), 5.61; N (Dumas), 8.49.

EXAMPLE III

3-[5-(4-phenyl-1-piperazinyl)pentyl]-5-phenyl-2-oxazolidinone (A) N-[5-(4-phenyl-1-piperazinyl)pentyl]-β-hydroxyphenethylamine: A mixture of 4-phenyl-1-(5-aminopentyl)piperazine (29 g.) and styrene oxide (14 g.) in 100 ml. of anhydrous ethanol was heated under reflux for 6 hours. The solvent was removed and the residue was recrystallized from 2-propanol to give 14 g. of product, M.P. 113–114° C.

Analysis.—Calcd. for $C_{23}H_{33}N_3O$ (percent): N (basic), 7.62. Found (percent): N (basic), 7.68.

The filtrate was heated under reflux an additional 12 hours after which a second crop of product was isolated (8.0 g.), M.P. 104–106° C. Total yield, 22.0 g.

(B) 3-[5-(4-phenyl-1-piperazinyl)pentyl]-5-phenyl-2-oxazolidinone dihydrobromide: The free base was prepared from the above described aminoalcohol and phosgene according to the procedure in Example I. A 10 g. sample of the free base was treated with excess HBr in 2-propanol. The salt (8.0 g.) melted at 183–185° C.

Analysis.—Calcd. for $C_{24}H_{31}N_3O_2 \cdot 2HBr$ (percent): Br, 28.80; N, 7.55. Found (percent): Br, 28.28; N, 7.43.

EXAMPLE IV

3-[3-(4-phenyl-1-piperazinyl)propyl]-2,4-dioxo-5-phenyloxazolidine (A) N-(4-phenyl-1-piperazinylpropylmandelamide: A mixture of 31.6 g. (0.17 mole) of ethyl mandelate and 32.5 g. (0.15 mole) of 4-phenyl-1-(3-aminopropyl) piperazine was heated to 150° C. and maintained at this temperature until no more ethanol distilled. The reaction mixture was shaken with ether and dilute HCl in order to separate neutral material. The free base was regenerated from the aqueous phase and extracted into CHCl₃. The extract was dried and concentrated to give 44 g. of crude product which was used directly in the next step:

$\nu_{max}^{CHCl_3}$ 3450 (OH, NH), 1675 cm.⁻¹ (amide C=O)

(B) 3-[3-(4-phenyl-1-piperazinyl)propyl] - 2,4-dioxo-5-phenyloxazolidine: The crude mandelamide (44 g.) was dissolved in 200 ml. of dry pyridine and 100 ml. of acetonitrile. To this solution was added 16 g. of ethyl chloroformate in a dropwise fashion while the temperature was maintained at 5° to 10° C. After the addition the mixture was distilled until the internal temperature reached 120° C. The reaction mixture was then heated under reflux for 1 hour. Water was added to precipitate the free base. The crude product was converted to the dihydrochloride by addition of excess HCl in 2-propanol. Recrystallization of the salt from aqueous 2-propanol gave 7.5 g. of product, M.P. 238–240° C.

*Analysis.*—Calcd. for $C_{22}H_{25}N_3O_3 \cdot 2HCl$ (percent): N basic, 3.08; N (total), 9.29; Cl, 15.68. Found (percent): N (basic), 3.09; N (total), 9.31; Cl, 15.63.

Medications including compounds of this invention were observed to reduce levels of cardiac norepinephrine in rats, a guanethidine-like characteristic generally associated with antihypertensive activity. A group of rats to be tested was separated into a control group and two test groups. Two medications, one including 3-[3-(4-phenyl-1-piperazinyl)propyl]-5-phenyl-2-oxazolidinone and one including 3-[3-(4-phenyl-1 - piperazinyl)propyl] - 4 - methyl - 5 - phenyl-2-oxazolidinone were administered intraperitoneally to separate groups of rats. A third group of rats, selected at random from an original total group, was maintained as controls and receive quantities of saline solution similar to the medication administered to the test rats. For each of the compounds a dose of 31 mg./kg. was used. After 8 hours the rats were sacrificed and the amount of norepinephrine in the heart of the test animals determined. The amount of norepinephrine present in the rats receiving 3-[3-(4-phenyl-1-piperazinyl)propyl]-5-phenyl-2-oxazolidinone was observed to be about 65.2% of the norepinephrine observed in the control rats. The amount of norepinephrine present in the heart of the rats receving 3-[3-(4-phenyl-1-piperazinyl)propyl]-4-methyl-5-phenyl-2-oxazolidinone was observed to be 76.46% of the norepinephrine present in the hearts of the control group of rats.

What is claimed is:

1. A compound selected from the group consisting of compounds of the formula:

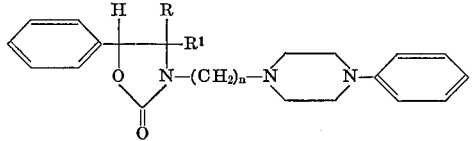

wherein R is hydrogen or methyl, $R^1$ is hydrogen or methyl, or $RR^1$ is oxygen, *n* is an integer from 2 to 5, and pharmacologically acceptale salts thereof.

2. A compound of claim 1 which is 3-[3-(4-phenyl-1-piperazinylpropyl]-5-phenyl-2-oxazolidinone.

3. A compound of claim 1 which is 3-[3-(4-phenyl-1-piperazinyl)propyl]-4-methyl-5-phenyl-2-oxazolidinone.

4. A compound of claim 1 which is 3-[5-(4-phenyl-1-piperazinyl)pentyl]-5-phenyl-2-oxazolidinone.

5. A compound of claim 1 which 3-[3-(4-phenyl-1-piperazinyl)propyl[-2,4-dioxo-5-phenyloxazolidine.

References Cited

UNITED STATES PATENTS 3,419,559   12/1968   Lunsford et al. _____ 260—268

OTHER REFERENCES

Morrison et al.: "Organic Chemistry," 1959, Allyn and Bacon, pp. 423 and 484.

Cornforth: "Heterocyclic Compounds," vol. 5, Elderfield, p. 396.

ALEX MAZEL, Primary Examiner

R. V. RUSH, Assistant Examiner

U.S. Cl. X.R.

424—250